United States Patent [19]
Regnault

[11] 3,816,982
[45] June 18, 1974

[54] AUTOMATIC DUST UNLOADING VALVE IN A CENTRIFUGAL AIR CLEANER

[75] Inventor: Jean Pierre Germain Regnault, Hem, France

[73] Assignee: International Harvester Company, Chicago, Ill.

[22] Filed: Dec. 13, 1972

[21] Appl. No.: 313,033

[52] U.S. Cl. .................... 55/337, 55/432, 55/449, 137/533.11
[51] Int. Cl. ............................................ B01d 50/00
[58] Field of Search ............ 55/337, 449, 432, 218; 137/533.11

[56] References Cited
UNITED STATES PATENTS

| 2,889,892 | 6/1959 | Schaub et al. | 55/432 |
| 3,096,825 | 7/1963 | Clark, Jr. | 137/533.11 |
| 3,243,043 | 3/1966 | Thompson et al. | 55/432 |
| 3,424,098 | 1/1969 | Bender | 137/533.11 |
| 3,429,108 | 2/1969 | Larson | 55/337 |

FOREIGN PATENTS OR APPLICATIONS

| 682,611 | 3/1964 | Canada | 137/533.11 |
| 1,416,352 | 9/1965 | France | 137/533.11 |

Primary Examiner—Bernard Nozick
Attorney, Agent, or Firm—Raymond E. Parks; Floyd B. Harman

[57] ABSTRACT

An automatic unloading valve for an air filter in the intake circuit of an internal combustion engine, which valve comprises a ball trapped within a vertical cylindrical exhaust duct between an annular valve seat and a retaining member. The ball is caused to frequently move away from the valve seat due to variations in air pressure and vibration of the engine, at which time dust accumulated within the filter can be discharged through the exhaust duct.

8 Claims, 5 Drawing Figures

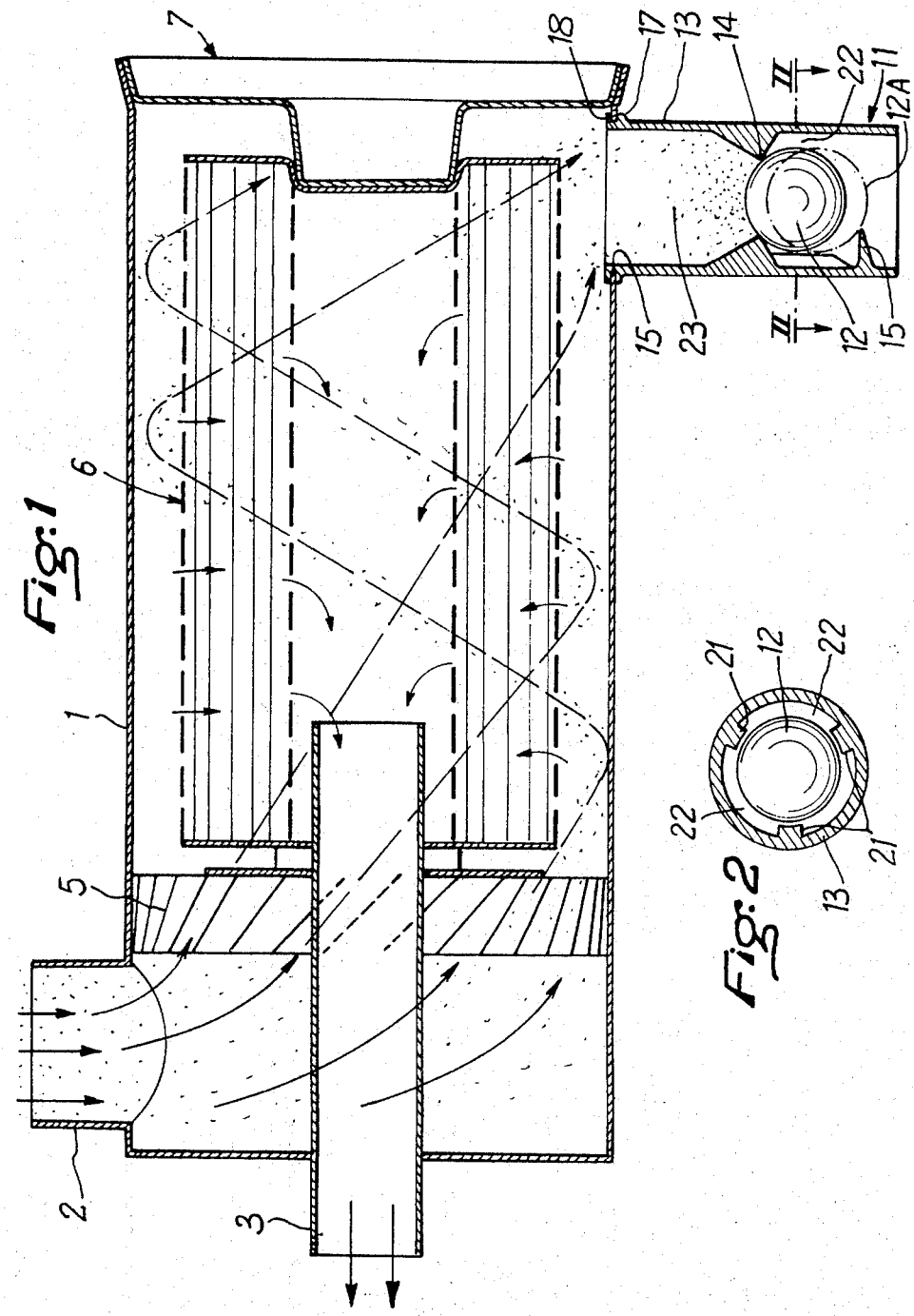

AUTOMATIC DUST UNLOADING VALVE IN A CENTRIFUGAL AIR CLEANER

This invention relates to air filters which work by centrifugation under a pressure below atmospheric pressure, of the type in which the bottom portion of the filter is fitted with an automatic valve for the removal of dust particles.

Air filters of this type which operate with a continuous air flow are already known, for example in U.S. Pat. No. 3,243,043. The structural design of these filters is such that there is formed within the interior of the filter a neutral pressure zone which is displaced progressively as the dust particles collect on the valve, with the result that the valve opens from time to time and allows the dust particles to fall outside the filter.

The aim of this invention is to provide an air filter which is intended to be mounted on the intake circuit of internal combustion engines, especially in combine-harvesters, that is to say a filter which does not need to operate continuously under an uninterrupted negative pressure of uniform value as was the case with the filter of the prior art which has just been mentioned but which, on the contrary, is frequently subjected to abrupt variations in negative pressure each time the operating speed of the engine changes.

The invention is therefore directed to a filter of very simple design and of less delicate operation, especially insofar as the valve does not need to be sensitive to the weight of dust which collects thereon.

To this end, in accordance with the invention, the valve is constituted by a ball which is capable of moving axially with substantial play within a vertical cylindrical duct between an annular valve-seat and a retaining member which are disposed respectively above and beneath said ball.

Thus, under the effect of fast variations in the value of negative pressure within the filter during operation of the engine and under the effect of the reduction in the power of adhesion of the valve to its seat owing to the presence of a layer of dust on said valve and also under the effect of vibrations of the engine, the ball carries out small jumping movements and permits the discharge of a small quantity of dust particles as each movement takes place.

The invention will be more readily understood by reference to the following description and by examination of the accompanying drawings which show by way of example a few forms of construction of an air filter in accordance with the invention, and in which:

FIG. 1 is a longitudinal vertical sectional view of the complete assembly of a first embodiment of an air filter according to the invention:

FIG. 2 is a part-sectional view taken along line II—II of FIG. 1;

Figure 3:
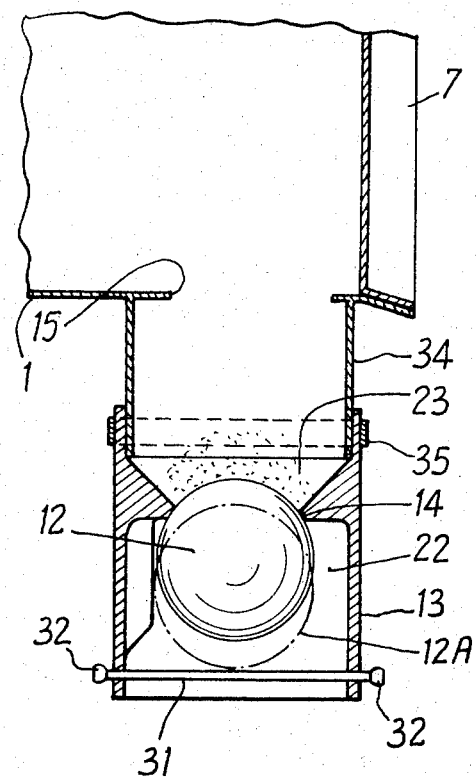
FIG. 3 is a vertical sectional view of a first alternative form of the valve assembly of the filter of FIG. 1.

The air filter for a heat engine, as generally illustrated in FIG. 1, comprises a horizontal cylindrical body 1 with a top radial tube 2 for the admission of air and a horizontal axial tube 3 for the discharge of filtered air. A ring of inclined fins 5 is intended to impart a centrifugal movement to the air which is admitted into the filter through the tube 2 in order that the air should come into contact with the wall of the body 1 and deposit dust particles thereon as well as any water droplets which it may contain whilst the air which is freed from a large proportion of its dust particles passes through a tubular filter element 6, said element being held in position on the inner extremity of the outlet tube 3 by means of a cover 7 which is secured by appropraite clamping means in accordance with a conventional mode of assembly.

The device for automatic evacuation of dust particles as generally designated by the reference 11 is placed at the bottom rear portion of the body 1. The device is essentially constituted by a ball-valve 12 which is capable of moving axially with substantial play within a vertical cylindrical duct 13 between an annular valve-seat 14 and retaining elements 15 located respectively above and beneath said ball-valve. The upper extremity of the duct 13 is connected to an opening 15 formed in the wall of the filter body 1. In the example which is illustrated, the filter body is of sheet metal whilst the duct 13 of the dust evacuation device is of semi-flexible plastic material and is provided at its upper extremity with an annular bead 17 in which is formed an annular groove 18 engaged over the edge of the opening 15 of the filter body.

The annular valve-seat 14 is formed in this example by a narrowed portion of the bore of the duct 13, said narrowed portion being limited by the surfaces of two cone frustums which are inverted with respect to each other. The minimum diameter of this narrowed portion is smaller than the diameter of the ball-valve 12 in order that this latter should be capable of closing-off said duct.

Longitudinal ribs 21 (see also FIG. 2) which project from the lower portion of the duct 11 are located at a short distance from the ball-valve in order that this latter should be suitably guided in its vertical displacements while providing spaces 22 of substantial cross-sectional area for the evacuation of dust particles.

The retaining elements 15 are constituted in this example by radial tongues which may be three in number, for example, and molded in one piece with the remainder of the duct, the extremities of said tongues being located on a circumference having a diameter which is smaller than that of the ball-valve. At the time of manufacture of the dust-evacuation device, it is therefore possible to insert the ball-valve 12 into the lower extremity of the duct 13 by bending upwards the tongues 15 which then return to their normal position as shown in the drawing.

The vertical travel of the ball-valve 12 is therefore equivalent to the distance between the position of said ball-valve as shown in full lines at 12 when this latter is in contact with the annular valve-seat 14 and the position shown in chain-dotted lines at 12A in which said ball-valve is displaced from its seat and rests on the retaining elements 15.

The operation of the filter is as follows.

The dust-laden air which is drawn in from the atmosphere passes into the interior of the filter body 1 through the top inlet 2; by passing between the helical fins 5, the air is subjected to a helical movement which has the effect of centrifugalizing the dust particles towards the exterior and towards the rear of the filter. Said dust particles therefore fall and collect within the well 23 which is formed by the top portion of the duct 13 of the dust-evacuation device.

During operation of the heat engine in which this filter is mounted, the ball-valve 12 is maintained applied against its seat 14 by the negative pressure which exists within the filter body 1 under the effect of the suction produced by the engine within the horizontal outlet tube 3 of the filter.

When the filter is clean and there are no dust particles within the well 23, the ball-valve 12 is tightly applied against its seat 14.

As the dust collects within the well 23, it forms between the ball-valve and the interior of the filter body 1 an insulating layer which reduces the force of attraction of the ball-valve against its seat. Under the combined action of this reduction of the effect of negative pressure on the ball-valve and of the mechanical vibrations of the engine which carries the filter as well as the suction impulses at each admission stroke of one engine-cylinder, the ball-valve jumps and permits a certain quantity of dust particles located above this latter to pass out on the one hand through the annular space which is momentarily freed between the ball-valve and the seat and on the other hand through the spaces 22. In spite of the partial vacuum or negative pressure which exists within the filter body, the dust does not penetrate inside the filter since the effect of the negative pressure is not sufficient under these conditions. When a certain quantity of dust particles is evacuated, the action produced on the valve by the negative pressure which exists within the filter is then sufficient once again to cause the return of the ball-valve which is re-applied against its seat and consequently closes-off the bottom portion of the well 23.

At the time of total stoppage of the engine, the negative pressure no longer exists within the filter, with the result that the ball-valve is no longer aspirated and falls to its bottom position as shown in chain-dotted lines at 12A in FIG. 1, in which it is retained by the tongues 15; the ball-valve then opens the annular space 22 to the full extent, thereby permitting complete evacuation of the dust which has collected within the well 23.

The evacuation of dust particles is greatly facilitated by the actual shape of the spherical ball-valve inasmuch as this latter offers a curved surface which permits very limited dust retention, especially by virtue of the fact that, as a result of its disordered movements of verical displacement and of rotation, the ball-valve continually offers a different face to the dust particles which fall thereon while at the same time ensuring, in the open position, a wide annular evacuation passage which prevents any danger of clogging of the conduits and jamming of the valve.

The assembly is of simple and economic construction.

Figure 4:
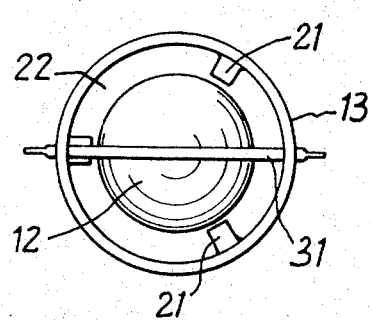
FIG. 4 is a bottom plan view corresponding to FIG. 3.

The alternative embodiment illustrated in FIGS. 3 and 4 differs from the embodiment of FIGS. 1 and 2 only in another form of valve-retaining elements and in an alternative mode of attachment of the duct 13 to the filter body 1. The retaining element 31 is constituted by a simple diametral rod which traverses the lower extremity of the duct 13 and the two extremities of which are flattened as indicated at 32 in order to ensure that said rod is not liable to escape suddenly. Attachment of the duct 13 is carried out simply by engaging this latter over a connecting-piece 34 which is fixed opposite to the opening 15 of the filter body 1, this assembly being preferably strengthened by means of a clamping collar 35.

Figure 5:
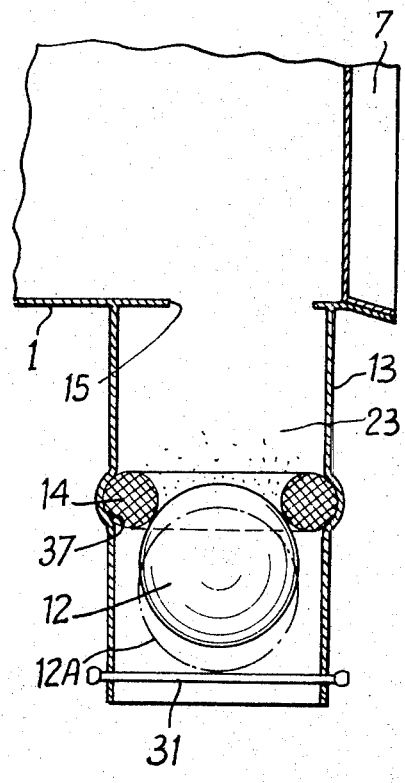
FIG. 5 is a vertical sectional view of another alternative form of construction of the valve assembly.

Finally, there is shown in FIG. 5 another alternative embodiment in which the duct 13 is a thin-walled part made from sheet metal, for example, and welded to the filter body 1 opposite to the opening 15 of this latter whilst the annular valve-seat 14 is constituted by a part of elastomer having the shape of a torus and forcibly fitted in a corresponding die-stamped annular groove 37 formed in the internal face of the wall of said duct. The member which serves to retain the ball-valve 12 is again constituted in this example by a diametral rod 31.

It is readily apparent that the invention is not limited to the embodiments which have been described with reference to the accompanying drawings and that modifications can be made therein, depending on the applications which are contemplated, without thereby departing from the scope of the invention.

I claim:

1. In a centrifugal air cleaner of the type having a housing, the housing having air inlet and outlet ports, an air filter element supported in the housing and communicating with the ports, and a dust discharge port in the bottom of the housing remotely spaced from the inlet and outlet ports, and an improved dust unloading valve means in the discharge port for intermittent opening and closing operation in response to a pressure change in the housing for clearing the discharge port of accumulated dust, the improvement comprising:

the discharge port being a tube connected to the housing and having an upper end communicating with the housing and a lower end communicating with the atmosphere;

valve seat means in the tube below the upper end, the valve seat means having a central annular opening;

a ball in the tube below the valve seat means, the ball having a circumference larger than the opening in the valve seat means;

retainer means in the tube below the ball for preventing the ball from dropping out of the lower end of the tube; and guide means in the tube reducing the inner diameter of the tube between ring means and retainer means to a clearance fit with the ball for guiding the ball upwardly into the opening of the valve seat means.

2. The apparatus according to claim 1, wherein the retainer means comprises a finger-like projection extending from the inner wall of the tube.

3. The apparatus according to claim 1, wherein the retainer means comprises a pin extending through the tube above the lower end.

4. The apparatus according to claim 1, wherein the guide means comprises at least three-spline-like ribs radially spaced around the inner wall of the tube, the spaces between the ribs forming passageways for the egress of dirt past the ball.

5. The apparatus according to claim 4, wherein the retainer means comprises a finger-like projection extending from the inner wall of the tube.

6. The apparatus according to claim 4, wherein the retainer means comprises a pin extending through the tube above the lower end.

7. In a centrifugal air cleaner of the type having a housing, the housing having air inlet and outlet ports, an air filter element supported in the housing and communicating with the ports, and a dust discharge port in the bottom of the housing remotely spaced from the inlet and outlet ports, an improved dust unloading valve means in the discharge port for intermittent opening and closing operation in response to a pressure change in the housing for clearing the discharge port of the accumulated dust, the improvement comprising:

the discharge port being a tube connected to the housing and having an upper end communicating with the housing and a lower end communicating with the atmosphere;

valve seat means in the tube below the upper end, the valve seat means being an O-ring seated in an annular internal groove in the tube;

a ball in the tube below the O-ring; and retainer means in the tube below the ball for preventing the ball from dropping out of the lower end of the tube.

8. The apparatus according to claim 7, wherein the retainer means comprises a pin extending through the tube above the lower end.

* * * * *